United States Patent Office 3,114,260
Patented Dec. 17, 1963

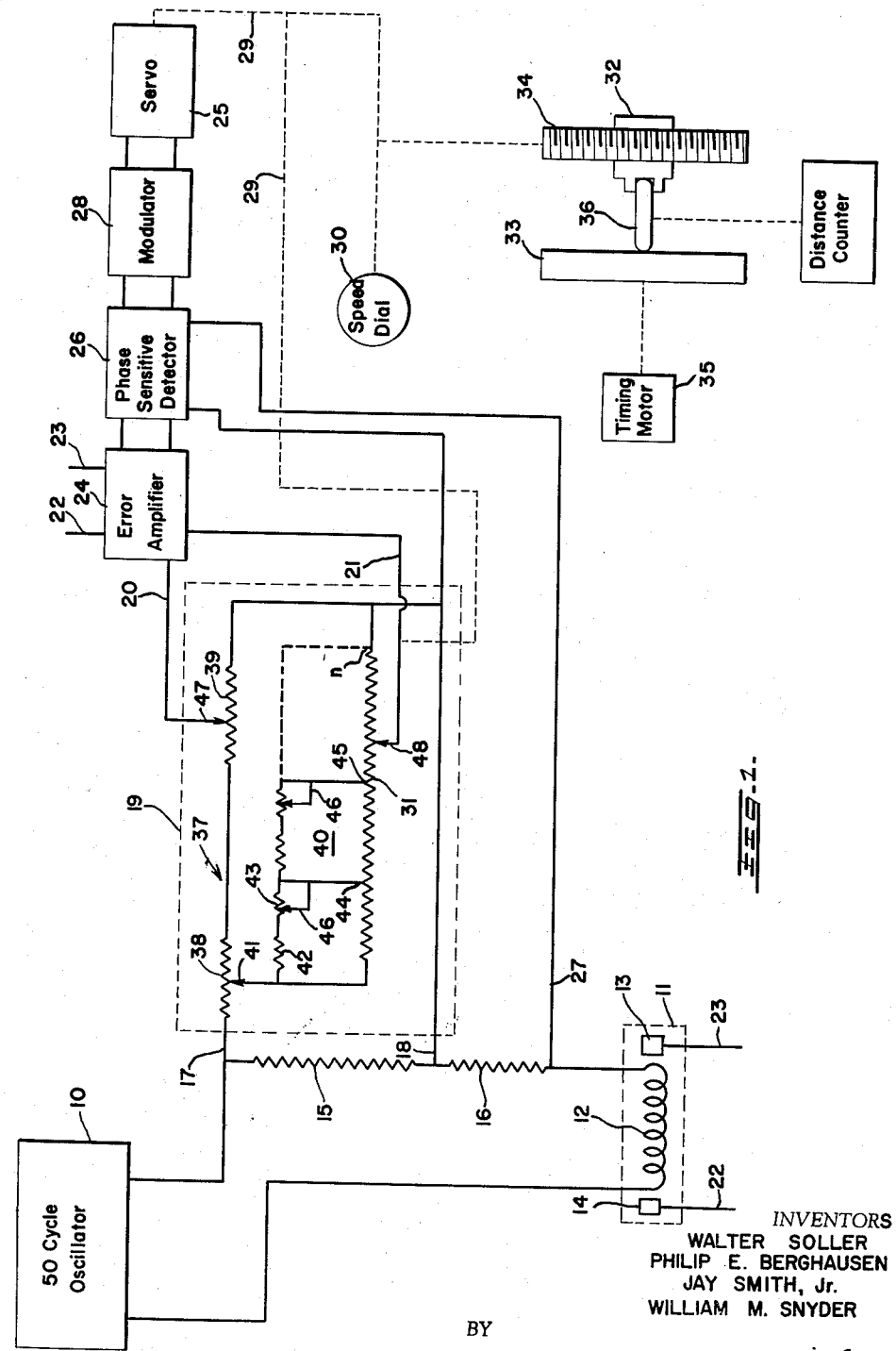

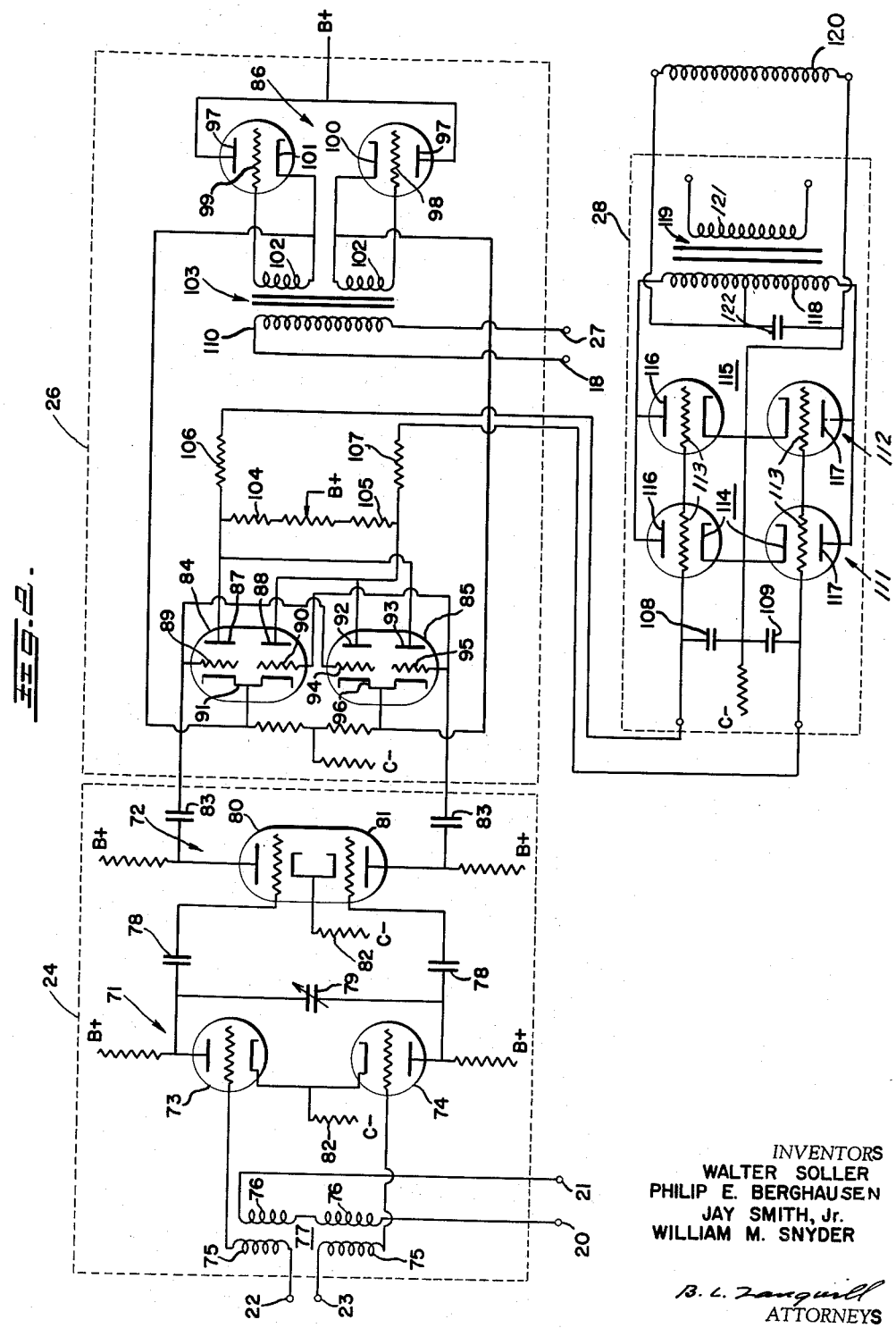

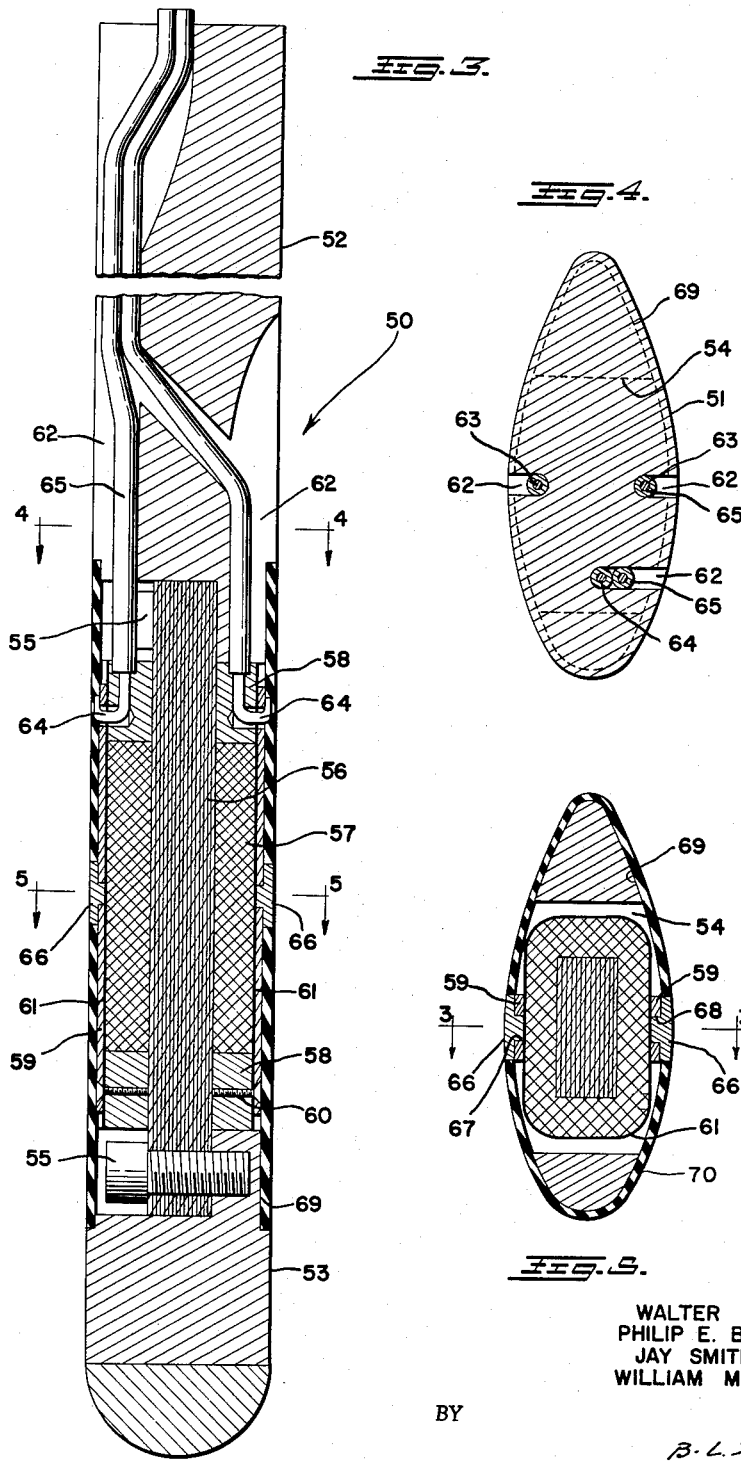

3,114,260
ELECTROMAGNETIC LOG
Walter Soller and Philip E. Berghausen, Cincinnati, Ohio, and Jay Smith, Jr., Silver Spring, and William M. Snyder, Kensington, Md., assignors to the United States of America as represented by the Secretary of the Navy
Filed May 29, 1956, Ser. No. 588,203
7 Claims. (Cl. 73—181)

This invention is an improvement on that disclosed and claimed in application Serial No. 588,202, filed of even date herewith, for Electromagnetic Log.

These inventions relate to fluid velocity measuring devices; more particularly they relate to an electromagnetic underwater means for measuring the speed of a ship through water, and specifically relate to an improved measuring and indicating circuit and apparatus embodying an electromagnetic log for accurately indicating the speed and distance traveled by a ship.

Heretofore, practicable devices for measuring the velocity of a ship through water utilized mechanical devices responsive to the force of flowing water exerted thereon, hydrodynamic devices responsive to differential pressures, thermal devices responsive to cooling rates effected by flowing water, and sonar devices which utilized the "Doppler" principle. These and other devices suffered many disadvantages; and their responses were affected by such factors as friction of moving parts, salinity, pressure, density, and temperature variations in the water. Calibration of such devices was difficult with the result that high-accuracy measurements of velocity could not be obtained without elaborate and expensive compensatory schemes.

Among the devices known to the prior art for measuring the speed of a ship are electromagnetic logs. However, electromagnetic logs of the prior art utilized sensing elements or electromagnetic units that were supported near or flush with a ship's hull and that employed direct current fields. As the water adjacent a moving ship's hull also moves but at different rates, the velocities measured were not the true ship's velocities. Furthermore these devices required relatively large power inputs in order to set up a magnetic field of sufficient intensity to produce a measurable signal voltage; but in spite of the high power, the signal voltage obtainable was so small in magnitude as to be frequently masked by variations in electrolytic and extraneous potentials.

In theory and practice, water in which ships move may be considered a continuous conducting medium. When an alternating magnetic field is established in this medium, an alternating electromotive force is induced around any closed circuit in the water due to the time variation of the magnetic flux and to the relative motion of the water with respect to the field. This induced electromotive force or voltage, E, is perpendicular to the direction of motion of the water and has a value:

$$\text{Curl } E = \frac{\partial B}{\partial t} + \frac{\partial B}{\partial X} v$$

where $$\frac{\partial B}{\partial t}$$

is the time derivative of the flux density, and $$\frac{\partial B}{\partial X} v$$

is a spacial derivative of flux intensity as a coefficient of the velocity, $v$. The first term is an ordinary transformer voltage considering the water as a secondary coil; while the second term is a voltage proportional to the relative velocity of the ship. This induced voltage may be measured by cutting the closed circuit and locating a suitable non-conducting plane in the fluid with its plane surfaces parallel to the direction of motion, and mounting a pair of electrodes insulated from each other on opposite sides of the plane surfaces of the non-conducting member and in electrical contact with the water. However, the transformer voltage is of a greater magnitude than the velocity voltage and ordinarily masks out the velocity voltage.

The aforesaid inventions provide improved apparatus for very accurately measuring the velocity of a body moving relatively to a conducting fluid; and in particular for measuring the speed of a ship with respect to water without any of the disadvantages of the prior art. A special feature is the minimizing of the effect of the factor of induced voltage that arises from transformer action and that is not directly related to the ship's speed.

In general, an electromagnetic log comprises an electromagnetic unit or a rodmeter which establishes the magnetic field and senses induced voltages, and a circuit connected to the rodmeter which measures said voltages and converts them to indications of speed and distance. In order to establish the fields, the rodmeter comprises a field establishing means in the form of a coil that can be energized by an exciting current, and comprises pickup electrodes for sensing the voltages. In accordance with the inventions, the construction of the rodmeter is such that the magnetic field is so aligned with respect to the pickup electrodes as to substantially eliminate transformer voltages; and the measuring circuit is such that any remaining transformer voltages due to the misalignment of the field are separated from the velocity voltage by taking advantage of the fact that the transformer voltages are 90° out of phase with the desired velocity voltages. The rodmeter is so constructed that its magnetic circuits have negligible core losses, whereby the magnetic flux will be in phase with and proportional to the exciting current of the rodmeter; and since the velocity voltage is in phase with the flux and proportional to its density, the velocity voltage will also be in phase with the exciting current. To further increase the utility of the invention, the measuring circuit to which the rodmeter electrodes are connected has a high-input resistance as compared with the resistance of the water between the electrodes. Consequently, variations in the latter resistance have minor effects; and the velocity voltage is independent of the conductivity of the water since it may be assumed that eddy currents are negligible. Furthermore, the rodmeter is streamlined or faired, and is supported from the keel of a ship so as to be in a region where the water flow is substantially unaffected by the ship's motion.

The signal voltage from the rodmeter is delivered to an amplifier. In the amplifier a feedback voltage is subtracted from it. The feedback voltage is in phase with and proportional to the rodmeter exciting current and to the indicated speed. Adjustments are made so that the resultant error voltage, when the feedback voltage is subtracted from the signal voltage, is zero when the indicated speed is the true speed. The error voltage is amplified and then rectified in a phase sensitive detector or discriminator to which is supplied a reference voltage in phase with the rodmeter exciting current so that the detector responds only to error inputs which are in phase or 180° out of phase with the reference voltage. The resultant direct current error is used to modulate a 60-cycle modulator whose output is applied to a servo motor. The servo motor is coupled through suitable gearing to an indicator dial and to a voltage dividing resistor. The output of the voltage dividing resistor, which is the feedback voltage, is proportional to the indicated speed. The servo motor reduces the error voltage to zero and the indicator dial will then read the correct or true speed. The servo motor also positions the carriage of an integrating table where the speed is converted into distance traveled.

Accordingly, an object of the invention is to provide a practicable electromagnetic underwater log adapted to accurately measure speed and distance traveled by a ship.

A further object of the invention is to provide a rodmeter for measuring voltages proportional to fluid velocity wherein said voltages are independent of variations in the characteristics of the fluid and transformer voltages.

Another object of the invention is to provide an electromagnetic log for measuring a ship's speed utilizing an improved circuit which substantially eliminates errors due to extraneous magnetic fields, errors due to rodmeter construction, and errors due to relative velocities between ship and water.

Another object of the invention is the provision of a rodmeter which utilizes an alternating source of excitation and which is so constructed that the magnetic field set up is in phase with the exciting current.

Still another object of the invention is to provide an easily calibrated electromagnetic flowmeter adapted to respond to very small changes in velocity with a minimum of error.

A further object is the provision of an electromagnetic flowmeter employing circuitry whereby faulty or sluggish operation is minimized.

Still another object is the provision of an electromagnetic unit adapted to be so placed in the water as to be substantially unaffected by turbulent flow of water adjacent a ship's hull.

Other objects and many of the attendant advantages of this invention will be readily appreciated as the same becomes better understood by reference to the following details and descriptions when considered in connection with the accompanying drawings in which like reference numerals designate like parts throughout the figures thereof, and wherein:

FIG. 1 is a block diagram, partially schematic, of an improved electromagnetic log system of the invention;

FIG. 2 is a schematic diagram of components shown in block form in FIG. 1;

FIG. 3 is a cross sectional view of the rodmeter of the invention taken along lines 3—3 of FIG. 5;

FIG. 4 is a sectional view of the rodmeter taken along lines 4—4 of FIG. 3; and

FIG. 5 is a sectional view of the rodmeter taken along lines 5—5 of FIG. 3.

Referring now to the drawings, wherein like reference characters designate like or corresponding parts throughout the several views, there is shown in FIG. 1 an alternating current source 10 for exciting a rodmeter generally designated at 11. The frequency of the source 10 is designed as low as possible to reduce transformer or quadrature voltages yet high enough so that signal voltages can be amplified with negligible phase shift. In the preferred embodiment, in order to avoid 60-cycle stray voltages that may be present in the water due to the ship's power system, the alternating current source 10 utilizes a push pull oscillator operating at 50-cycles, but it is to be understood that other frequencies above or below 60-cycles may be employed.

The rodmeter 11, which will be described in detail later, comprises essentially a coil 12 for setting up an alternating magnetic field and a pair of electrodes 13 and 14 for picking up voltages balanced with respect to ground and proportional to velocity induced in the water moving relative thereto.

The rodmeter coil 12 is excited from the current source 10 in series with a feedback resistor 15 and a reference voltage resistor 16. Connected in parallel with feedback resistor 15, through conductors 17 and 18, is a calibrating and feedback circuit generally designated by reference 19. This circuit 19 has output leads 20 and 21 for a feedback signal which is delivered to an error amplifier 24. The voltage of this feedback signal is proportional to indicated speed, as will later be apparent. The error amplifier 24 also receives, through conductors 22 and 23, the velocity signal from electrodes 13 and 14. The feedback signal and velocity signal are delivered in phase opposition to the error amplifier 24 so that the amplifier produces an error voltage which is the difference between the velocity signal voltage as obtained from the rodmeter, and the feedback voltage, and amplifies this error voltage. This error voltage controls the operation of a two-phase servo motor 25 which in turn controls the feedback voltage.

To eliminate extraneous voltages present in the signal voltage, the output of the error amplifier 24 is coupled to a phase sensitive detector 26. The reference voltage from across resistor 16 is also supplied via conductors 18 and 27 to the phase sensitive detector 26 which produces a direct current output proportional to the amplified error signal while eliminating any quadrature signals, noise, or unbalanced signals, since it is designed, as well be described later, to respond only to inputs in phase with or 180° out of phase with the reference signal.

The direct current output of the detector 26 is coupled to a modulator 28 that converts the direct current error voltage to a 60-cycle error voltage which is applied to one phase winding of the servo motor 25. The other phase winding of the motor 25 is supplied by a 60-cycle quadrature voltage obtained from ship's power system.

The servo motor 25 is coupled through suitable shafting 29 to a speed indicator 30 and to a voltage dividing resistor or heliopotentiometer 31 in the feedback circuit 19. The servo motor 25 also positions a carriage 32 of an integrating table 33 through a screw 34. The integrating table 33 is rotated at a constant speed by a synchronous or timing motor 35 supplied by a constant frequency power source. A roller mechanism 36 mounted for linear movement with the carriage is mounted between the carriage 32 and table 33. This roller mechanism 36 includes a friction-driven wheel which will have a rate of rotation in accordance with its position with respect to the center of the rotating table 33. Hence linear displacements of the carriage 32, which are proportional to rotary movement of the servo motor 25 as determined by speed, are converted into rotary motions proportional to distance traveled. Through suitable gearing, a counter coupled with the roller mechanism 36 is provided to indicate distance traveled.

As discussed above, the electromagnetic unit at the end of the rodmeter 11 produces a velocity signal which is proportional to the relative velocity between the ship and the water immediately adjacent to the electromagnetic unit. Water adjacent to the moving ship above, in general, moves in the direction of the ship. The rodmeter is supported by the ship, but it has been found impracticable because of strength considerations to extend the rodmeter sufficiently far from the ship to reach undisturbed water; and therefore the velocity induced signal voltages are produced by relative velocities that are less than the actual or true ship's velocities. These relative velocities are not proportional to ship's true velocity, but are a non-linear function of the ship's true velocity. To take into account this non-linear relationship is the function of the calibrating and feedback circuit 19.

The calibrating and feedback circuit 19 comprises a first branch circuit generally designated by reference 37 in parallel with the feedback resistor 15. The circuit 37 has in series a full-scale setting potentiometer 38 and a zero-scale setting potentiometer 39. The circuit 19 also comprises a second branch circuit generally designated by reference 40 in parallel with the feedback resistor 15 and a portion of the full-scale potentiometer 38 through the latter's adjustable arm 41. The second branch circuit 40 comprises a plurality, N, of pairs of fixed calibrating resistors 42 and variable calibrating resistors 43 all serially connected, and as a whole in parallel with the voltage dividing potentiometer 31. The fixed calibrating resistors 42 are adapted to correct for non-linearities due to rodmeter construction and the variable calibrating resistors 43 for non-linearities in relative water flow. By properly adjusting these resistors, the feedback voltage supplied to the amplifier 24 can be made to approach a non-linear function of the position of the shaft 29 of the voltage dividing potentiometer 31. Connected between each pair of fixed and variable calibrating resistors 42 and 43 and predetermined spaced points and preferably equally spaced points 44, 45 . . . N on potentiometer 31 are a plurality of control arms 46. The output of the calibrating and feedback circuit 19 is taken from the adjustable arm 48 of the voltage dividing potentiometer 31 and the adjustable arm 47 of the zero-scale potentiometer 39.

In order to properly adjust the calibrating circuit, the ship is run at speeds determined by independent means usually over a measured mile, taking due account of any currents present. However, the heliopotentiometer 31 will deliver feedback voltages proportional to relative velocities, that is, indicated speeds which are non-linearly related to true speeds when the calibrating controls 46 are in a neutral position.

For adjustment or calibration the speed dial 30 is set at zero speed when the ship is stationary through adjustment of the zero-scale potentiometer 39, and is set at full-scale when the ship is running at full speed through adjustment of potentiometer 38. At speeds intermediate zero and full speed, the indicated speed is corrected to actual speeds by adjustment of calibrating controls 46 within their range of control. Recapitulating, when the indicated speed is not equal to the true speed as independently determined, the controls 46 may be adjusted to reduce this error to zero at zero speed, full speed and a plurality of equally spaced points between.

It can now be seen that the indicated speed, when the error voltage is zero, is no longer a function of the rodmeter excitation current since both the feedback and the signal voltage are proportional to the excitation current. The error voltage therefor is proportional to the error between indicated and true speeds and changes phase by 180° as the error voltage passes through zero.

Referring now specifically to FIGS. 3, 4 and 5, the rodmeter 11 comprises a faired or streamlined strut 50 designed to be extended through a sea valve and to project into the water below the ship. The faired or streamlined body 51 of the strut is constructed of non-magnetic material, preferably Monel metal, and comprises an upper section 52, a lower section 53, and a partially hollow or slotted central section 54 (FIGS. 4 and 5). Secured at its ends within the hollow central section 54 as by stainless steel bolts 55 is a laminated core 56 constructed to minimize core losses. Wound symmetrically around the central portion of the core 56 is a coil 57 insulated from the core by any suitable insulating material and preferably paper insulation. The coil is coated with a phenolic resin and then surrounded by a thin bronze screen shield 61 whereby the flux is caused to emanate from substantially the core ends. The shield 61 may be open mesh material, coated with a phenolic resin whereby it is insulated from pickup plates 59. Placed at the upper and lower ends of the coil 57 are plate mounts 58 of insulating material, preferably Formica, formed to receive the core 56. A pair of rectangular pickup plates 59 of conducting material are mounted on opposite sides of the coil and core structure and are secured to the plate mounts 58 as by bolts 60 of non-magnetic material, preferably brass.

The upper portion of the rodmeter body 52 is provided with slots 62 formed therein as seen in FIG. 4 through which conductors 63 and 64 to the coil 57 and pickup plates 59 are inserted. The slots 62 in the upper portion are filled in with a solder filler and sanded to a streamline form. The conductors 63 and 64 are conveyed to their terminal points through hollow brass rods 65. A pair of circular electrodes 66 preferably platinum having dowel-like projections 67 are mounted on the pickup plates 59 in holes 68 formed therein. The plate mounts 58 are also provided with openings therein through which the coil and electrode conductors 63 and 64 pass, the latter connecting to the pickup plates 59.

As may be seen in the figures the body of the rodmeter is undercut as at 69 in the central region 54 so that when the electrodes 66 are in position they will be flush with a line connecting their outer surfaces with the surfaces of the upper and lower sections of the rodmeter body. A sheath 70 of rubber material or the like is used to fill in the undercut 69 in the central region whereby the electromagnetic unit is made watertight and whereby the rodmeter is completely electrically insulated from the water in the vicinity of the electrodes 66.

As can be seen all of the major structural parts of the rodmeter are of non-magnetic material whereby magnetic field variations caused by ambient conditions are minimized. The symmetrical construction substantially eliminates transformer or quadrature voltages; and the utilization of magnetic circuits having small core losses, whereby the flux generated will be in phase with the exciting current, substantially eliminates voltages induced by fluxes out of phase with the exciting current which would give rise to erroneous measurements.

Referring now specifically to FIG. 2 there is shown a schematic diagram of the amplifier 24, phase sensitive detector 26 and modulator 28 all provided with suitable B and C supplies. The amplifier comprises two stages 71 and 72 of amplification. The first stage 71 comprises a pair of triodes 73 and 74 or preferably pentodes connected in balanced push pull relation. The balanced velocity signals from conductors 22 and 23 and the feedback signals from conductors 20 and 21 are coupled to the grids of triodes 73 and 74 in phase opposition through the primaries 75 and, secondaries 76 respectively of a feedback transformer 77. The first stage is coupled through condensers 78 to the second stage 72 and any phase shift due to condensers 78 is eliminated by a variable condenser 79 connected across the plates of triodes 73 and 74. The second stage comprises similarly a pair of triodes 80 and 81 connected in push pull relation. Each stage is provided with large unbypassed resistors 82 at the common cathode connection to reduce amplification of unbalanced signals while permitting high amplification of balanced signals. The balanced output of the amplifier is coupled to a balanced phase sensitive detector through condensers 83.

The phase sensitive detector comprises duo triodes 84 and 85 and duo triode 86. Duo triode 84 comprises plates 87 and 88, grids 89 and 90 and common cathode 91; duo triode 85 comprises plates 92 and 93, grids 94 and 95 and common cathode 96; and duo triode 86 comprises plates 97, grids 98 and 99 and cathodes 100 and 101. As can be seen from the figure, the push pull output of the voltage amplifier is connected to grids 89 and 94 in parallel and 90 and 95 in parallel respectively. Cathodes 91 and 96 of duo triodes 84 and 85 are each connected in parallel and each in parallel with one of the cathodes 100 and 101 of triode 86. Cathodes 100 and 101 are connected to their respective grids 98 and 99 through the secondaries 102 of reference transformer 103.

The plates 87 and 88 of duo triode 84 are connected in parallel respectively to plates 93 and 92 of duo triode 85; the combined plate currents passing through load resistors 104 and 105 and are filtered by resistors 106 and 107 in combination with condensers 108 and 109. A potentiometer in series with load resistors 104 and 105 is also provided to vary the plate load resistors 104 and 105 so that the output voltage can be adjusted to zero in the presence of no in phase signal even if the characteristics of duo triodes 84 and 85 are dissimilar.

In operation the reference voltage is supplied to duo triode 86 through the primary 110 of the reference transformer 103. For one half of the reference cycle one half of duo triode 86 is conducting while the other half is cut off and the reverse is true during the other half of the reference cycle. Since the cathodes 91 and 96 of triodes 84 and 85 are each connected in parallel with one of the cathodes 101 and 100 of duo triode 86, when one-half of duo triode 86 is conducting, one or the other of duo triodes 84 and 85 will conduct and the other will be cut off since one of the cathodes 91 or 96 is in parallel with the half of 86 which is cut off. During the next half-cycle the situation reverses. As pointed out above the plates of 84 and 85 are connected in parallel in a different manner from their grids so that one of the combined plate currents is proportional to one side of the push pull input from the amplifier during one-half cycle and proportional to the other side during the other half cycle. The output of the phase sensitive detector 26 then is a balanced push pull direct current voltage which is proportional to the component of push pull input voltage which is in phase with the reference voltage. Any quadrature components not eliminated by the design of the rodmeter as well as frequencies other than the reference frequency, and unbalanced frequencies produce no output.

The push pull direct current output of the phase sensitive detector is applied to the balanced modulator 28 which comprises two identical stages 111 and 112 connected in parallel to handle the power required by the servo motor 23. Each stage comprises a pair of triodes 114 and 115 connected in balanced relationship, the plates 116 and 117 of each half are connected to the secondary 118 of a 60-cycle transformer 119 whereby each half is fed by out of phase 60-cycle power from the secondary 118; the common cathodes of each stage are connected to a suitable bias supply. The direct current output of the detector 26 is applied to the grids 113 of the triodes 114 and 115. When there is zero signal applied to the modulator, each half of the modulator conducts the same 60-cycle current; since the voltages supplied to the plates 116 and 117 of stages 114 and 115 are out of phase, the resulting output voltage contains no 60-cycle component. When a direct current signal is applied to the grids 113 of stages 114 and 115 of the modulator 28, the two halves of each stage conduct different amounts and a 60-cycle voltage, which is in phase with or 180° out of phase with the line voltage supplied by the primary 121 of transformer 119, appears across the load of the modulator; the exact phase being determined by which grid of the modulator is most positive or whether the error signal is in phase or out of phase with the reference voltage. The load is one of the windings 120 of the servo motor 23 which is resonated by a condenser 122.

Obviously many modifications and variations of the present invention are possible in the light of the above teachings. It is therefore to be understood that within the scope of the appended claims the invention may be practiced otherwise than as specifically described.

What is claimed is:

1. An apparatus for measuring a ship's velocity comprising, a streamlined body adapted to be supported in the water below the ship from the ship's keel, coil and core means within said body, an oscillator for exciting said coil and core means with an electric current whereby an alternating magnetic field is projected into the water, electrode means oppositely positioned on said body in electrical contact with the water and insulated from said coil and core means, said electrodes being responsive to voltages induced in the water as a result of said alternating magnetic field, a push pull amplifier connected to said electrodes for amplifying in push pull said induced voltages, a feedback circuit for applying to said amplifier a feedback voltage having the same phase and frequency as said exciting current in opposition to said induced voltages, means connected to the output of said amplifier for eliminating induced voltages other than velocity induced voltage, said last named means having a balanced push pull direct current output, means for converting said direct current output to an alternating current, servo means connected to said converting means, said alternating current being applied to one winding of said servo means, and means in said feedback circuit responsive to said servo means for adjusting the feedback voltage to thereby zero the amplifier output, the movement of said servo means being proportional to the ship's velocity.

2. An apparatus as recited in claim 1 wherein said means for eliminating voltages other than velocity induced voltages comprises a reference source of voltage of the same phase and frequency as said exciting current and said velocity induced voltages, phase discriminator means, means for applying said reference voltage and said amplified induced voltages to said phase discriminator means, and circuit means in said phase discriminator means responsive only to amplified induced voltages in phase with or 180° out of phase with said reference voltage.

3. An apparatus as recited in claim 2 wherein said circuit means comprises first, second, third and fourth vacuum tubes each having at least a cathode, grid, and plate element, means for applying said amplified induced voltages to the grid elements of said first and third tubes in parallel and to the grid elements of said second and fourth tubes in parallel, said first and second tubes having a common cathode and said third and fourth tubes having a common cathode, means connecting said common cathodes in parallel, means connecting the plate elements of said first and fourth tubes and the plate elements of said second and third tube, means for filtering said combined output, and means for applying said reference voltage to one of said common cathodes during one-half of its cycle and to the other of said common cathodes during its other half cycle whereby said circuit means will produce an output signal only when said induced voltages are in phase with or 180° out of phase with said reference voltage.

4. An apparatus as recited in claim 1 further including calibrating means in said feedback circuit whereby the non-linear relationship between relative velocity and true velocity may be compensated.

5. In an electromagnetic log system comprising an alternating current excited rodmeter responsive to voltages induced in a moving fluid, and means responsive to said induced voltages for indicating velocity, said rodmeter comprising a streamlined body of non-magnetic material adapted to be supported from one end and project into said fluid, a laminated core structure mounted in the end of said body away from its supported end, a coil symmetrically wound about and insulated from said core, oppositely positioned conducting pickup plates mounted within said body and insulated from said coil and body, conductors within said body for energizing said coil, electrodes in contact with said fluid, mounted on said pickup plates, and positioned symmetrically with respect to said core, insulating material surrounding said coil, core and pickup plates in the vicinity of said electrodes, and output conductors within said body connected to said pickup plates.

6. In an alternating electromagnetic underwater log system for measuring the true velocity of a ship through water comprising a rodmeter responsive to voltages induced in water moving relative thereto, and means responsive to said induced voltages proportional to the relative velocity of said ship for indicating its true velocity, said means including a feedback and calibrating circuit for subtracting from said induced voltage proportional to relative velocity a reference voltage of the same phase and frequency to null out said induced voltage, and means in said calibrating circuit for modifying the feedback voltage whereby it automatically compensates for the non-linear relationship between relative and true velocities.

7. A rodmeter for measuring the velocity of an electrically conducting fluid and adapted to be placed in said fluid comprising a magnetic core, a coil insulated from and symmetrically positioned about said core and adapted to be energized by an A.C. source, means for shielding said coil whereby alternating magnetic flux emanates substantially from the core ends, electrodes mounted on each side of said rodmeter and insulated from said coil and core, and an electrically insulating sheath positioned around said core, coil, and shielding means whereby the induced electrical currents in said fluid may be reduced thereby increasing the voltage developed across said electrodes.

References Cited in the file of this patent

UNITED STATES PATENTS

| | | |
|---|---|---|
| 2,480,646 | Grabau | Aug. 30, 1949 |
| 2,729,103 | Baynsford | Jan. 3, 1956 |
| 2,757,538 | Soffel | Aug. 7, 1956 |
| 2,771,771 | Kamp | Nov. 27, 1956 |

FOREIGN PATENTS

| | | |
|---|---|---|
| 726,271 | Great Britain | Mar. 16, 1955 |

OTHER REFERENCES

Kolin: Volume 16, Number 5, The Review of Scientific Instruments, May 1945.

Guelke: The Measurement of Sea-Water Velocities by Electromagnetic Induction. Journal of the Institution of Electrical Engineers. Volume 94. April 18, 1946.